(12) United States Patent
Park et al.

(10) Patent No.: US 10,020,916 B2
(45) Date of Patent: Jul. 10, 2018

(54) METHOD AND APPARATUS FOR DATA COMMUNICATION OF VEHICLE

(71) Applicant: HYUNDAI MOTOR COMPANY, Seoul (KR)

(72) Inventors: Jae Woo Park, Anyang-si (KR); Dong Youl Lee, Yongin-si (KR); Sang Jae Han, Suwon-si (KR); Chul Min Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 227 days.

(21) Appl. No.: 14/957,635

(22) Filed: Dec. 3, 2015

(65) Prior Publication Data

US 2017/0085340 A1   Mar. 23, 2017

(30) Foreign Application Priority Data

Sep. 22, 2015 (KR) .................. 10-2015-0133966

(51) Int. Cl.
| | |
|---|---|
| *H04L 1/08* | (2006.01) |
| *H04L 12/40* | (2006.01) |
| *H04L 29/08* | (2006.01) |
| *H04W 4/00* | (2018.01) |
| *H04B 1/3822* | (2015.01) |
| *H04W 4/70* | (2018.01) |
| *B60R 21/00* | (2006.01) |
| *H04W 84/18* | (2009.01) |

(52) U.S. Cl.
CPC ............ *H04L 1/08* (2013.01); *B60R 21/00* (2013.01); *H04B 1/3822* (2013.01); *H04L 12/40* (2013.01); *H04L 67/10* (2013.01); *H04W 4/005* (2013.01); *H04W 4/70* (2018.02); *H04L 2012/40215* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 9,652,423 | B2 * | 5/2017 | Monroe | ............... G06F 13/385 |
| 2009/0240392 | A1 * | 9/2009 | Yamashita | ............. H03M 7/46 |
| | | | | 701/31.4 |

(Continued)

FOREIGN PATENT DOCUMENTS

| | | |
|---|---|---|
| JP | 2015-112944 A | 6/2015 |
| KR | 10-0773076 B1 | 11/2007 |

(Continued)

OTHER PUBLICATIONS

Korean Office Action dated Nov. 18, 2016 issued in Korean Patent Application No. 10-2015-0133966.

*Primary Examiner* — Shirley Zhang

(74) *Attorney, Agent, or Firm* — McDermott Will & Emery LLP

(57) ABSTRACT

A vehicle communication system includes at least one vehicle controller configured to control functions of a vehicle and configured to output data related to the vehicle. A communication unit is configured to transmit the data output from the vehicle controller to an external data collecting device. A memory is configured to store the data. A network managing unit is configured to control the communication unit to output the data to the data collecting device when the data is different from previous data transmitted to the data collecting device.

10 Claims, 6 Drawing Sheets

| Header | PID(1) | CAN ID(2) | Start Bit(1) | width(1) | Data(n) | Tail | TRANSMIT WHOLE DATA |
|---|---|---|---|---|---|---|---|
| | | MESSAGE ID | 0 | 64 | 64bit DATA | | |

| Header | PID(1) | CAN ID(2) | Start Bit(1) | width(1) | Data(n) | Tail | TRANSMIT PARTIAL DATA |
|---|---|---|---|---|---|---|---|
| | | MESSAGE ID | 48 | 8 | 8bit DATA | | |

(56) References Cited

U.S. PATENT DOCUMENTS

| | | | | |
|---|---|---|---|---|
| 2010/0245071 | A1* | 9/2010 | Fujisawa | B60K 35/00 340/461 |
| 2010/0332706 | A1* | 12/2010 | Hering | G06F 13/4295 710/106 |
| 2013/0339721 | A1* | 12/2013 | Yasuda | G07C 5/008 713/100 |
| 2014/0162219 | A1* | 6/2014 | Stankoulov | G09B 19/167 434/65 |
| 2014/0337550 | A1* | 11/2014 | Boeck | G06F 13/4295 710/107 |
| 2015/0112543 | A1* | 4/2015 | Binion | G07C 5/085 701/32.2 |
| 2015/0208142 | A1* | 7/2015 | Gladigau | H04Q 9/00 340/870.07 |
| 2015/0215125 | A1* | 7/2015 | Park | H04L 63/1466 380/255 |
| 2015/0244826 | A1* | 8/2015 | Stenneth | H04Q 9/00 709/213 |
| 2016/0225198 | A1* | 8/2016 | Punjabi | G07C 5/008 |
| 2016/0371977 | A1* | 12/2016 | Wingate | B60W 50/16 |

FOREIGN PATENT DOCUMENTS

| | | |
|---|---|---|
| KR | 10-2011-0101972 A | 9/2011 |
| KR | 10-2014-0085133 A | 7/2014 |
| KR | 10-2014-0146411 A | 12/2014 |

\* cited by examiner

| Header | PID(1) | CAN ID(2) | Start Bit(1) | width(1) | Data(n) | Tail | TRANSMIT WHOLE DATA |

MESSAGE ID  0  64  64bit DATA

| Header | PID(1) | CAN ID(2) | Start Bit(1) | width(1) | Data(n) | Tail | TRANSMIT PARTIAL DATA |

MESSAGE ID  48  8  8bit DATA

FIG.4

METHOD AND APPARATUS FOR DATA COMMUNICATION OF VEHICLE

CROSS-REFERENCE TO RELATED APPLICATION

This application is based on and claims the benefit of priority to Korean Patent Application No. 10-2015-0133966, filed on Sep. 22, 2015 in the Korean Intellectual Property Office, the disclosure of which is incorporated herein in its entirety by reference.

TECHNICAL FIELD

The present disclosure relates to a method and an apparatus for data communication of a vehicle, and more particularly, to a method for data communication of a vehicle that transmits data to an exterior using a wireless communication, and an apparatus using the same.

BACKGROUND

In general, data communication inside a vehicle has been mainly performed by control area network (CAN) communication. In the CAN communication, data transmission/reception is performed by cycle communication that continuously repeats every preset cycle and event communication that transmits data in a specific event. Such cycle communication, however, inevitably and excessively increases the amount of transmission data.

Since existing data communication of a vehicle is used only inside the vehicle, it has a closed circuit characteristic. Recently, there has been a continuous need to transmit entire data information inside the vehicle in various ways such as client information management, vehicle control software (SW) post support, and big data collection to outside the vehicle. For this, wireless data communication has been widely used to transmit the data to outside the vehicle.

However, when the entire vehicle data is transmitted through the wireless data communication, cost increases due to an increase in data amount, it is difficult to ensure a transmission bandwidth according to transmission of mass data, and a numerous transmission error occurs.

When there is a large amount of data being transferred in the data transmission, a compression algorithm is used. Here, additional system load occurs according to an encoding of the compression algorithm and a decoding of a server collecting data.

Accordingly, when information inside the vehicle is converted and transmitted through the wireless communication such as the CAN communication, it is required to transmit duplicated transmission data while decreasing a wireless communication level to a certain level in order to efficiently use limited wireless communication resources.

SUMMARY

The present disclosure has been made in view of the above problems. An aspect of the present inventive concept provides a data preprocessing and wireless communication protocol in consideration of vehicle CAN communication characteristics when performing wireless communication transmission of CAN communication information inside the vehicle.

Another aspect of the present inventive concept provides a vehicle data communication method capable of reducing a processing load of a vehicle data collection server and improving the performance by reducing the amount of processing data, and an apparatus using the same.

Still another aspect of the present inventive concept provides a vehicle data communication method capable of supporting rapid processing of a CAN message and signal information by using CAN database information, and an apparatus using the same.

Accordingly, regardless of a vehicle type, CAN information area standardization is possible with respect to a server for collecting data, a controller (MICOM) of a terminal, and an application processor (AP).

In accordance with an embodiment of the present inventive concept, a vehicle communication system includes at least one vehicle controller configured to control functions of a vehicle and to output data related to the vehicle. A communication unit configured to transmit the data output from the vehicle controller to an external data collecting device. A memory is configured to store the data. A network managing unit is configured to control the communication unit to output the data to the data collecting device when the data is different from previous data transmitted to the data collecting device.

The data is transmitted in a data format including packet number information, bit number information indicating the bit number from which data starts, data length information, and a CAN identifier identifying a message. When the data is partially changed to be different from the previous data transmitted to the data collecting device, a position of a changed data bit may be included in the bit number information and a length of the changed data may be include in the data length information.

The data transmitted to the data collecting device is stored in the memory. When a data re-transmission request is received from the data collecting device, the network managing unit re-transmits the data stored in the memory to the data collecting device for a preset number of times.

The network managing unit transmits entire data to the data collecting device periodically at a preset cycle regardless of the data change.

The network managing unit determines a data disuse area for a period time during which non-available data is able to be output, and does not transmit data output from the data disuse area to the data collecting device.

The network managing unit determines whether data output from two or more vehicle controllers are duplicated, and transmits one of the data output from the two or more vehicle controllers to the data collecting device, when the data are duplicated based on the determination result.

In accordance with another embodiment of the present inventive concept, a vehicle data communication method includes generating data related to a vehicle; determining whether the generated data is different from previous data transmitted to an external data collecting device; and transmitting the generated data to the external data collecting device when the generated data is different from the previous data transmitted to the external data collecting device, based on the determination result.

The present disclosure provides a data preprocessing and wireless communication protocol in consideration of vehicle CAN communication characteristics when performing wireless communication transmission of CAN communication information inside the vehicle.

In addition, the present disclosure provides a vehicle data communication method capable of reducing a processing load of a vehicle data collection server and improving the performance by reducing an amount of processing data, and an apparatus using the same.

Further, the present disclosure provides a vehicle data communication method capable of supporting a rapid processing of a CAN message and signal information by using CAN database information, and an apparatus using the same.

In addition, accordingly, according to the present disclosure, regardless of a vehicle type, the CAN information area standardization is possible with respect to a server for collecting data, a controller (MICOM) of a terminal, and an application processor (AP).

BRIEF DESCRIPTION OF THE DRAWINGS

The objects, features and advantages of the present disclosure will be more apparent from the following detailed description in conjunction with the accompanying drawings.

FIG. 4 is a diagram illustrating a wireless transmission data format according to an embodiment of the present inventive concept.

DETAILED DESCRIPTION

Figure 1:
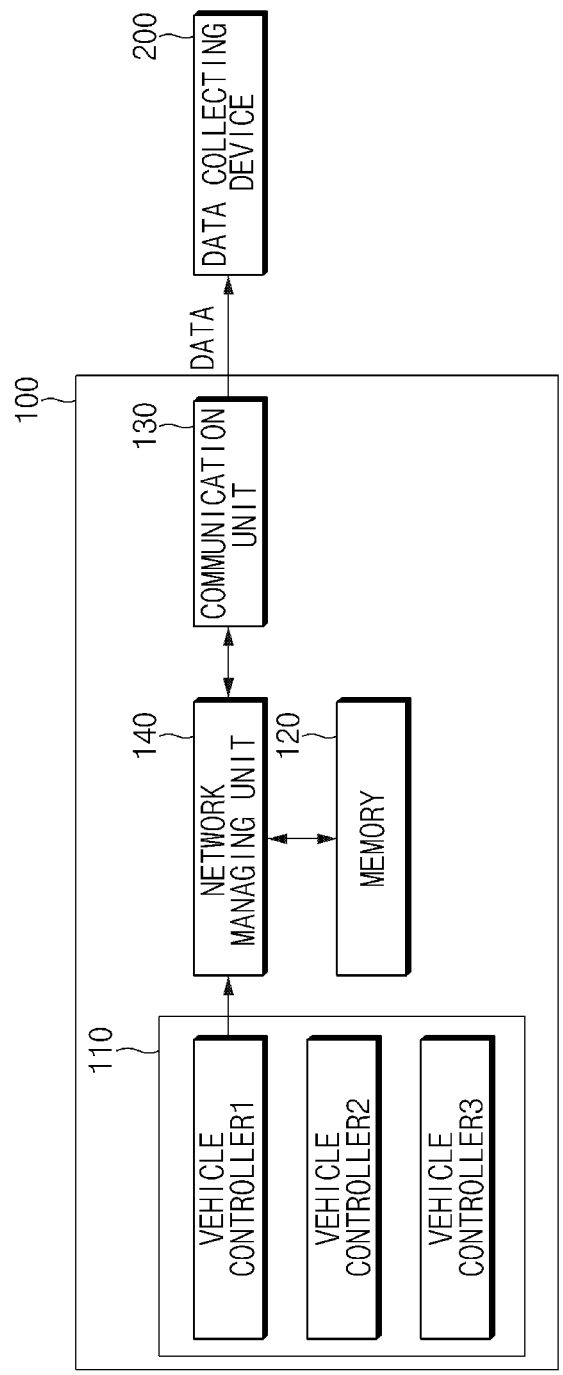
FIG. 1 is a diagram illustrating a vehicle communication system according to an embodiment of the present inventive concept.

Exemplary embodiments of the present inventive concept are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Detailed descriptions of well-known functions and structures incorporated herein may be omitted to avoid obscuring the subject matter of the present disclosure. Terms and words used in the specification and the claims shall not be interpreted as commonly-used dictionary meanings, but shall be interpreted as to be relevant to the technical scope of the disclosure based on the fact that the inventor may property define the concept of the terms to explain the disclosure in best ways. Although embodiments have been described with reference to a number of illustrative embodiments thereof, it should be understood that numerous other modifications and embodiments can be devised by those skilled in the art that will fall within the spirit and scope of the principles of the present disclosure. The some constituent elements shown in the drawings may be exaggerated, omitted or schematically drawn for the purpose of convenience or clarity.

FIG. 1 is a diagram illustrating a vehicle communication system according to an embodiment of the present inventive concept.

As shown in FIG. 1, a vehicle communication system 100 according to the present disclosure may include a vehicle controller 110, a memory 120, a communication unit 130, and a network managing unit 140. In addition, the vehicle communication system 100 may transmit data to an external data collecting device 200 through wireless communication with the external data collecting device 200.

The vehicle communication system 100 may include constituent elements included in the vehicle, include an independent module included in the vehicle, or may include an independent module which is detachably mounted in the vehicle to set or test a situation of requiring to remotely transmit the data.

The vehicle communication system 100 may further include at least one multi-media processing module which is not shown. The multi-media processing module may be merged in the vehicle communication system 100 or may be provided as a separate system.

The data collecting device 200 may be configured by various terminals, servers, and applications for receiving data from the vehicle communication system. Alternatively, the data collecting device 200 may include a different system or module inside the vehicle. That is, if such constituent element is configured to receive data related to the vehicle, this constituent element may be a data collecting device regardless of a communication type or an internal or external constituent element of the vehicle. However, it is illustrated that the data collecting device 200 of the present disclosure is configured by a server or a terminal for wirelessly receiving data related to the vehicle from the outside of the vehicle. In addition, the vehicle communication system 100 may change or encode the CAN communication data that is data of the data communication inside the vehicle to a data format for wireless communication to transmit the changed or encoded data to the data collecting device 200.

At least one vehicle controller 110 is provided. The vehicle controller 110 may control functions of the vehicle and may generate and output the data related to the vehicle. The data related to the vehicle of the present disclosure may include data necessary to be applied to various fields such as client information management, post support of vehicle control software, and big data collection. The data related to the vehicle may include various information indicating entire or partial data related to the vehicle.

The memory 120 may store data generated from the vehicle controller 110 or data transmitted to the data collecting device 200 through the communication unit 130. The memory 120 may include a buffer merged in the vehicle controller 110 or the network managing unit 140, and may be an independent storage.

The communication unit 130 may communicate with the data collecting device 200 under control of the network managing unit 140 to transmit the generated data to the data collecting device 200.

The network managing unit 140 controls communication of packets through network fabric among a plurality of vehicle controllers 110, the memory 120, the communication unit 130, and multi-media processing modules (not shown) based on individual contents of packets according to a vehicle network communication protocol. Further, the network managing unit 140 is operated to easily perform network resource management in order to support the communication of packets through the network fabric according to a global vehicle network communication protocol. Here, when there is a large amount of data, a compression algorithm may be used.

In addition, when the data generated from the vehicle controller 110 is different from previous data transmitted to the data collecting device 200, the network managing unit 140 according to the present disclosure may control the communication unit 130 to output the data to the data collecting device 200.

When the existing data communication inside the vehicle is accomplished, the data may include a sum of a plurality of bytes including various information (signals) to be transmitted and received. The data may be transmitted and received on a preset cycle. Alternatively, when there is a need to rapidly transmit specific information, the data may be transmitted and received in an event transmission method of transmitting the data while disregarding a transmission cycle.

In this case, all data may be re-transmitted regardless of whether a specific signal, that is, a partial value of the data is changed or the same information as previous information, which is transmitted and received, is transmitted. In particular, in a case of event transmission, in order to prevent data loss, the same data may be continuously transmitted several times, e.g., three times. When applying the existing data transmission method to a wireless data communication environment, the amount of data may extremely increase.

Accordingly, in order to solve this, the network managing unit 140 according to the present disclosure may implement data communication realizing data reduction.

First, a value of the firstly transmitted data is stored in a data reception protocol and the data collecting device 200. That is, the first data is wirelessly transmitted regardless of a reduction method, and the data reception protocol and the data collecting device 200 may store the data value.

The data for each cycle or for each event to be transmitted later may be signaled to the exterior only when the data is different from previous signaled data. That is, the network managing unit 140 may transmit wirelessly only the data that is different from the previous data among the data received from the vehicle controller 110. If the data is identical with the previous data, it may be disregarded.

Figure 2:
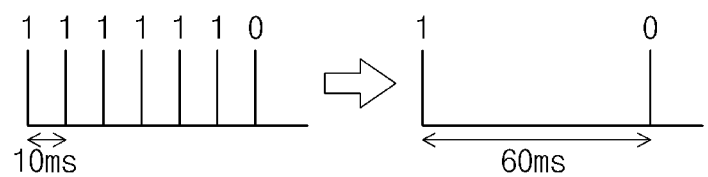
FIG. 2 is a diagram illustrating an example of data transmission according to an embodiment of the present inventive concept.
Figure 3:
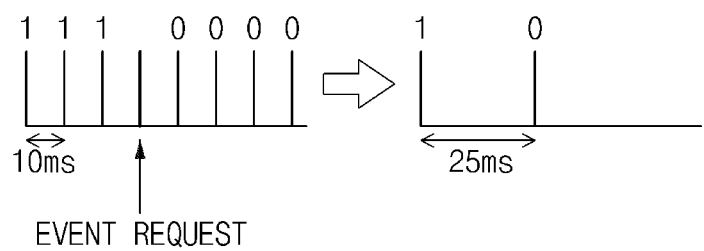
FIG. 3 is a diagram illustrating an example of data transmission according to another embodiment of the present inventive concept.

FIGS. 2 and 3 are diagrams illustrating an example of data transmission according to the present disclosure.

FIG. 2 shows transmission of data when the data is changed in a cyclic data transmission method. FIG. 3 shows that the data is transmitted only when the data is changed in a data transmission method when an event occurs or is requested while the data is transmitted in a preset cycle.

As shown in FIG. 2, if "1" which is transmitted in a cycle of 10 ms is transmitted once, "1" is not transmitted until "1" is changed to "0". After "1" is transmitted, "0" may be transmitted to outside after 60 ms.

Similarly, as shown in FIG. 3, after is transmitted, "0" is signaled at 25 ms when the event is requested. "1" transmitted on a cycle in the interval is not transmitted to the data collecting device 200.

In this case, the data collecting device 200, such as a server that received data or an application protocol, adds data during a cycle in which data transmission is omitted, with reference to information such as the existing communication cycle of a CAN communication database. Accordingly, the whole communication database of a control level which is originally performed may be recovered.

When the data is transmitted wirelessly, that is, when the data to be transmitted is different from previously transmitted data, partial data instead of entire data may be changed. In this case, the network managing unit 140 may transmit only the partial data changed for data reduction.

FIG. 4 is a diagram illustrating a wireless transmission data format according to an embodiment of the present inventive concept.

A top side of FIG. 4 shows a data format when the entire data is transmitted. A bottom side of FIG. 4 shows a data format when partial data is transmitted.

The data format may include packet number information (PID), bit number information (StartBit) indicating the bit number from which data starts, length (width) information of data, a CAN identifier (CAN ID) identifying a message, data, a header, and a tail. The PID is a packet number for preventing data loss due to an error. When transmitting the partially changed data, the bit number information represents the bit number of the changed data. The CAN ID may represent an address value of message pool (reception) or a certain preset message ID. The header and the tail represent a start point and an end point of the packet. When the header and the tail are additionally used in another communication layer, additional information (e.g., compression, division, password use, and the like) may be included.

When the data is partially changed to be different from previous data transmitted to the data collecting device 200, a position of the changed data bit may be included in the bit number information and a length of the changed data may be included in the data length information. For example, when a 3 bit signal data value starting from 30-th bit of data among the previously transmitted data is changed, a transmission data value may be transmitted as 3 bit signal data, a start data value may be transmitted as 30, and the data length (width) may be transmitted as 3.

A lower side data format of FIG. 4 shows that 8 bits changed from a 48-th bit is transmitted.

The network managing unit 140 may store a previous message for each message in a buffer in order to prevent a packet loss. When the data collecting device 200 such as a server requests re-transmission due to a PID mismatch problem, the network managing unit 140 may re-transmit the data. In the wireless data transmission, the network managing unit 140 may repeatedly transmit the data twice or three times as a basic transmission cycle of CAN data communication.

In addition, the network managing unit 140 may transmit the entire message regardless of change of data at a certain cycle (e.g., 10 multiple of a previous transmission cycle) in order to check data match between the data belong to the data collecting device 200 such as a wireless communication server and the communication data inside the vehicle.

If the entire data is received periodically at the certain cycle, the data collecting device 200 may check whether data is matched with each other.

Figure 5:
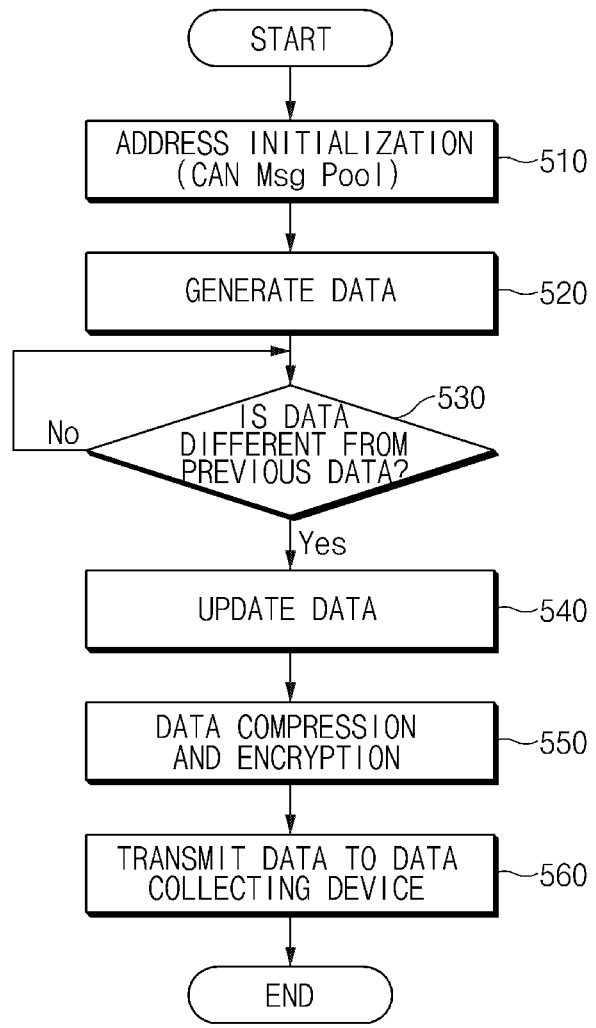
FIG. 5 is a flowchart illustrating a vehicle data communication method according to an embodiment of the present inventive concept.

FIG. 5 is a flowchart illustrating a vehicle data communication method according to an embodiment of the present inventive concept. Referring to FIG. 5, a vehicle data communication method according to the present disclosure is as follows.

First, address initialization such as CAN message pool for data communication may be accomplished (510).

At least one vehicle controller 110 generates data related to the vehicle periodically at certain cycle (520), and output the generated data to the network managing unit 140.

The network managing unit 140 waiting the data reception receives the data, the network managing unit 140 may determine whether the received data is different from previous data transmitted to the external data collecting device 200 (530). The network managing unit 140 may compare the received data with the currently stored data and determine a difference therebetween.

Based on the determination result, if the received data is different from previous data transmitted to the external data collecting device, the network managing unit 140 may update data in the memory 120 (540), and may perform data compression and encryption in order to transmit the data to the external data collecting device 200 (550).

The changed data is compressed, encrypted, and transmitted to the data collecting device 200 (560).

The data is transmitted in a data format including packet number information, bit number information indicating a bit number from which the data starts, data length information, and a CAN identifier identifying a message. When the data is changed, the position of the changed data bit may be included in the bit number information and the length of the changed data may be included in the data length information.

Although not shown, if a data re-transmission request is received from the data collecting device 200, the stored data may be re-transmitted to the data collecting device 200 for a preset number of times. The network managing unit 140 may transmit the entire data to the data collecting device 200 on a preset cycle regardless of the data change so that the match of the data may be checked.

Figure 6:
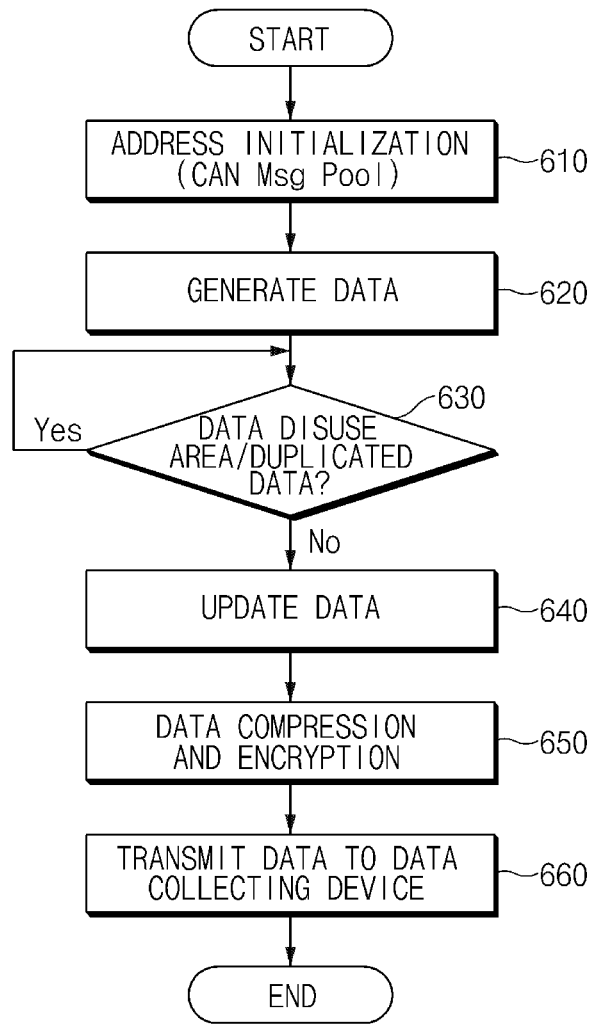
FIG. 6 is a flowchart illustrating a vehicle data communication method according to another embodiment of the present inventive concept.

FIG. 6 is a flowchart illustrating a vehicle data communication method according to another embodiment of the present inventive concept.

As shown in FIG. 6, address initialization such as CAN message pool may be accomplished (610). The step of generating data which is related to the vehicle periodically at a certain cycle by the vehicle controller 110 (620) is the same as step 520 of FIG. 5.

The network managing unit 140 according to the present disclosure may determine a data disuse area for a period of time during which non-available data can be output or may determine whether data output from two or more vehicle controllers are duplicated (630).

The data disuse area means a temporal area to which meaningless data is entered when the meaningless data is collected in a current vehicle state. For example, since mission relation data have no meaning for a certain time (e.g., 1.5 second) after change of a mission type, the time of 1.5 second becomes a data disuse area.

Further, in case of the vehicle, a communication network is divided into various communication networks such as a chassis CAN, a body CAN, and the like. Each communication network has a closed loop and communication is accomplished through a gateway. That is, there may be a vehicle controller for controlling the chassis CAN and a vehicle controller for controlling the body CAN. However, when the data is transmitted to the body CAN from the chassis CAN, the chassis CAN and the body CAN may collect the same two data in terms of a whole data collection. In this case, since the same data should be repeatedly transmitted, the wireless communication transmission may be loaded. When two messages which have different IDs but have the same content are simultaneously collected on a different communication network, the network managing unit 140 may determine this as data duplication.

The network managing unit 140 does not transmit data, which are output from the data disuse area, to the data collecting device 200. Based on the determination result, when the data is duplicated, the network managing unit 140 may transmit one of data output from two or more vehicle controllers to the data collecting device. That is, the duplicated data is not transmitted to the data collecting device 200.

Based on the determination result, when it is not the data disuse area and the data is not duplicated, as shown in FIG. 5, the data may be updated in the memory 120 (640), may be compressed and encrypted (650), and may be transmitted to the data collecting device 200.

As described above, the embodiment of the present inventive concept provides a method for data communication of a vehicle that can reduce a processing load of a vehicle data collection server and improve performance by reducing the amount of processing data, and can support rapid processing of a CAN message and signal information by using CAN database information, and an apparatus using the same.

In addition, regardless of a vehicle type, the CAN information area standardization is possible with respect to a server for collecting data, a controller (MICOM) of a terminal, and an application processor (AP).

In the above mentioned embodiments, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

The exemplary embodiment is disclosed herein, but the present disclosure is not limited to the disclosed embodiments, but on the contrary, is intended to cover various modifications and equivalent arrangements included within the appended claims and the detailed description and the accompanying drawing of the present disclosure.

What is claimed is:

1. A vehicle communication system comprising:
    at least one vehicle controller configured to control functions of a vehicle and configured to output data related to the vehicle;
    a communication unit configured to transmit the data output from the vehicle controller to an external data collecting device;
    a memory configured to store the data; and
    a network managing unit configured to control the communication unit to output the data to the data collecting device when the data is different from previous data transmitted to the data collecting device,
    wherein the data is transmitted in a data format including bit number information indicating a bit number from which the data starts and data length information, packet number information and a control area network (CAN) identifier identifying a message, and
    wherein when the data is changed partially to be different from the previous data transmitted to the data collecting device, a position of a changed data bit may be included in the bit number information and a length of the changed data may be included in the data length information.

2. The vehicle communication system of claim 1, wherein the data transmitted to the data collecting device is stored in the memory, and
    wherein when a data re-transmission request is received from the data collecting device, the network managing unit re-transmits the data stored in the memory to the data collecting device for a preset number of times.

3. The vehicle communication system of claim 1, wherein the network managing unit transmits the entire data to the data collecting device regardless of the data change on a preset cycle.

4. The vehicle communication system of claim 1, wherein the network managing unit determines a data disuse area for a period of time in which non-available data is output, and does not transmit data output from the data disuse area to the data collecting device.

5. The vehicle communication system of claim 1, wherein the network managing unit determines whether data output from two or more vehicle controllers are duplicated, and transmits one of the data output from the two or more vehicle controller to the data collecting device, when the data are duplicated based on the determination result.

6. A vehicle data communication method comprising:
generating, by a vehicle controller, data related to a vehicle;
determining, by a network managing unit, whether the generated data is different from previous data transmitted to an external data collecting device; and
transmitting, by a communication unit, the generated data to the external data collecting device when the generated data is different from the previous data transmitted to the external data collecting device, based on the determination result,
wherein the data is transmitted in a data format including bit number information indicating a bit number from which the data starts and data length information,
packet number information and a control area network (CAN) identifier identifying a message, and
wherein when the data is partially changed to be different from the previous data transmitted to the data collecting device, a position of a changed data bit may be included in the bit number information and a length of the changed data may be included in the data length information.

7. The vehicle data communication method of claim 6, further comprising:
storing the data transmitted to the data collecting device; and
re-transmitting the stored data to the data collecting device for a preset number of times, when a data re-transmission request is received from the data collecting device.

8. The vehicle data communication method of claim 6, further comprising transmitting entire data to the data collecting device periodically at a preset cycle regardless of the data change.

9. The vehicle data communication method of claim 6, further comprising determining a data disuse area for a period of time during which non-available data is output,
wherein data output from the data disuse area is not transmitted to the data collecting device.

10. The vehicle data communication method of claim 6, in which the vehicle further comprise two or more vehicle controllers configured to generate the data, the method further comprising:
determining whether data output from the two or more vehicle controllers are duplicated; and
transmitting one of the data output from the two or more vehicle controllers to the data collecting device, when the data are duplicated based on the determination result.

* * * * *